(12) United States Patent
Stuntebeck

(10) Patent No.: US 9,843,563 B2
(45) Date of Patent: Dec. 12, 2017

(54) SECURING RELAYED EMAIL COMMUNICATION

(71) Applicant: AirWatch LLC, Atlanta, GA (US)

(72) Inventor: Erich Stuntebeck, Marietta, GA (US)

(73) Assignee: AirWatch LLC, Atlanta, GA (US)

( * ) Notice: Subject to any disclaimer, the term of this patent is extended or adjusted under 35 U.S.C. 154(b) by 47 days.

(21) Appl. No.: 14/499,836

(22) Filed: Sep. 29, 2014

(65) Prior Publication Data

US 2016/0094522 A1     Mar. 31, 2016

(51) Int. Cl.
*H04L 29/06* (2006.01)
*H04L 12/58* (2006.01)
*H04L 9/30* (2006.01)

(52) U.S. Cl.
CPC .......... *H04L 63/0428* (2013.01); *H04L 9/30* (2013.01); *H04L 51/18* (2013.01); *H04L 51/36* (2013.01); *H04L 63/0442* (2013.01); *H04L 63/166* (2013.01); *H04L 63/065* (2013.01)

(58) Field of Classification Search
CPC ....................................................... G06F 19/00
USPC ....................................................... 713/151
See application file for complete search history.

(56) References Cited

U.S. PATENT DOCUMENTS

| | | | |
|---|---|---|---|
| 7,921,292 B1 | 4/2011 | Pauker et al. | |
| 8,667,069 B1 * | 3/2014 | Connelly | H04L 51/32 709/206 |
| 2004/0179684 A1 | 9/2004 | Appenzeller et al. | |
| 2005/0138353 A1 | 6/2005 | Spies et al. | |
| 2006/0143279 A1 * | 6/2006 | Yoshizawa | H04L 9/30 709/206 |
| 2009/0013379 A1 * | 1/2009 | Yoshioka | H04L 12/58 726/2 |
| 2009/0319781 A1 * | 12/2009 | Byrum | H04L 12/58 713/156 |
| 2011/0202616 A1 * | 8/2011 | Kinoshita | H04L 51/30 709/206 |

FOREIGN PATENT DOCUMENTS

WO     0197440     12/2001

OTHER PUBLICATIONS

Serenelli, B; Securing electronic mail systems; Year:2004; ACM; p. 677-680.*
Michael Herfert; Security-Enhanced Mailing Lists; IEEE Network o May/Jun. 1997; p. 30-33.*
Search Report dated Dec. 15, 2015 for PCT/US2015/052384.

* cited by examiner

*Primary Examiner* — Monjour Rahim

(57) ABSTRACT

Disclosed are systems and methods that facilitate encryption of email messages that are transported between mail servers. In some cases, email messages may be relayed through relay mail servers as well. An email message can be encrypted using a public key that corresponds to an organization associated with the recipient rather than a public key associated with the particular recipient. The email message can then be decrypted by the recipient mail server and deposited into a mailbox of the recipient.

19 Claims, 5 Drawing Sheets

SECURING RELAYED EMAIL COMMUNICATION

BACKGROUND

Email messages are transmitted from senders to recipients through networks such as local area networks or wide area networks such as the Internet. In many cases, a message is composed by a sender and sent via a mail server associated with the sender to a mail server associated with one or more recipient of the message. The mail server associated with the recipient can deposit the message into a mail folder or electronic mailbox that corresponds to the recipient. Additionally, depending on network conditions, routing conditions or other variables, a message may also be relayed via a relay mail server that is in communication with the mail server associated with the sender and the mail server associated with a recipient.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
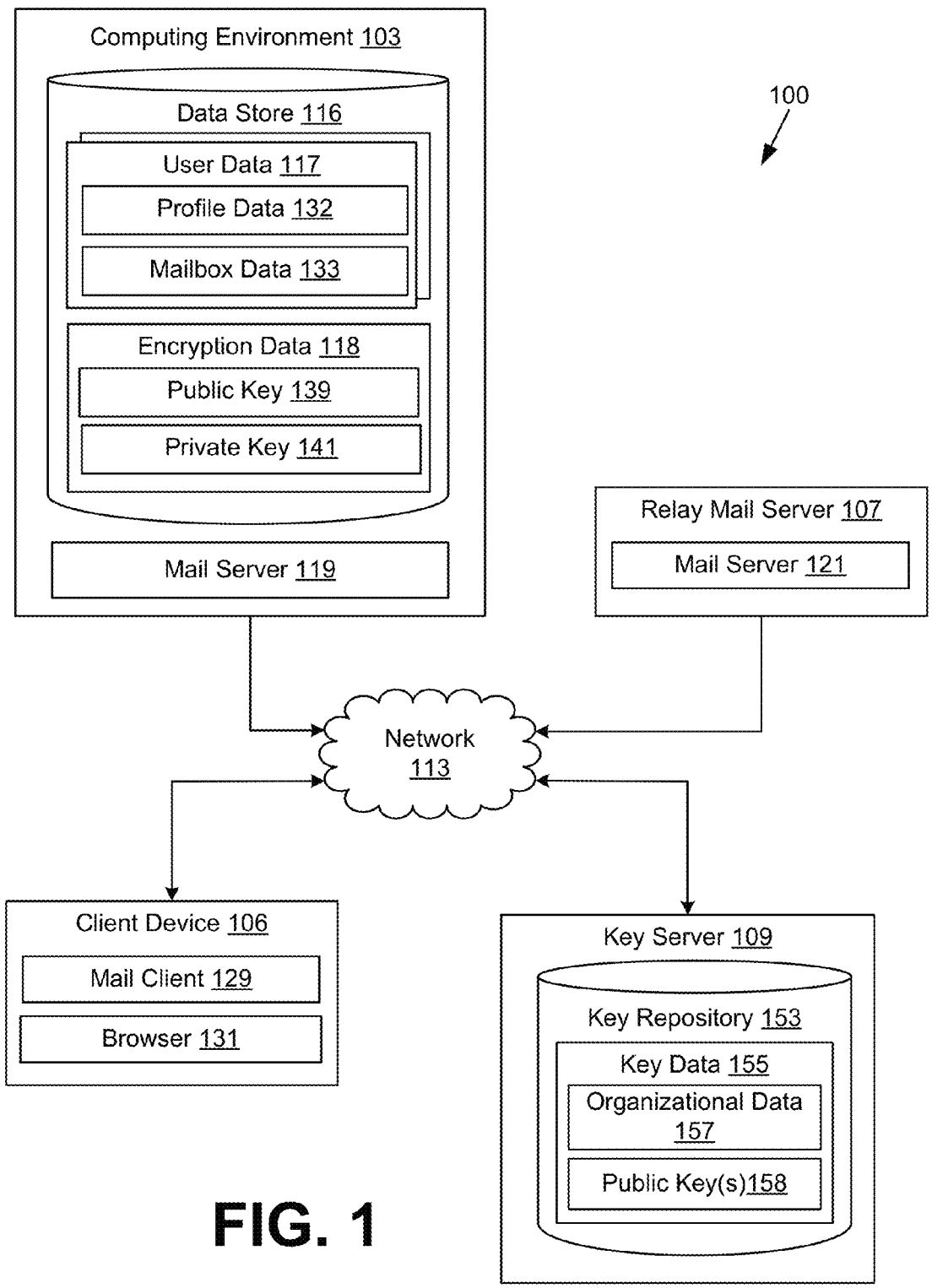
FIG. 1 is a drawing of a networked environment according to various embodiments of the present disclosure.

Email messages are sent from senders to recipients via mail servers with which senders and recipients are associated. For example, a sender of an email is associated with a user account which is managed by one or more sender mail servers. Such a user account may include one or more mailboxes, mail folders or any other construct in which email can be stored. Additionally, the user account is also often associated with the ability to send email through the sender mail server using mail client and/or a browser mail interface rendered a browser. Upon receiving a request to send an email message, the sender mail server can generate a mail transport message, or a data transport message conforming to a mail transfer or mail delivery protocol, such as a simple mail transport protocol (SMTP) DATA command that includes content corresponding to an email message. The sender mail server can then communicate with a mail server associated with the recipient, or a recipient mail server. The sender mail server can transmit the mail transport message to the recipient mail server, which can extract the email message from the mail transport message and deposit the email message as well as any corresponding metadata into a mailbox associated with the recipient.

In some embodiments, the sender mail server may relay the email message and the corresponding mail transport message through a relay mail server that is external to the recipient mail server. Such a relay process is supported by some mail transport protocols, such as SMTP and other protocols that are employed by mail servers to send, receive and/or relay email on the Internet. In such a scenario, the relay mail server may have access to the contents of the email message unless the contents are encrypted or otherwise obfuscated. Accordingly, certain encryption protocols or schemes can be employed to secure the contents of email messages. For example, Secure/Multipurpose Internet Mail Extensions (S/MIME) is a standard for encryption of the contents of email messages that employs a public key/private key methodology. However, employing S/MIME to encrypt or secure the contents of email message may require user adoption or user knowledge of how to apply the encryption and/or how to obtain a key pair.

For example, a public key associated with a recipient user of an email message may need to be obtained by the sender or a mail client used by the sender. Next, the sender or a mail client must encrypt the email message using the public key. The sender mail server can then send the encrypted email message and/or a mail transport message that complies with S/MIME or any other encrypted email standard or protocol to a recipient mail server directly or through a relay mail server. Then, a recipient or a mail client used by the recipient decrypts the encrypted email message using a private key that corresponds to the recipient's public key. In practice, some users may find it difficult or cumbersome to use public key/private key encryption methodologies, which can stunt the adoption rate of these encryption frameworks such as S/MIME. As a result, while transport layer encryption can be used for transmissions between mail servers, such as secure sockets layer (SSL) and/or transport layer security (TLS), a mail server acting as a relay mail server may have access to the contents of an email message unless the contents of the email message are also encrypted by employing S/MIME or other standards and protocols by which the contents of an email message can be encrypted. In the event that the relay mail server is a malicious server and/or managed by a malicious user, this presents a risk that the contents of an email message may be accessed without authorization.

Accordingly, embodiments of the disclosure can facilitate encryption and decryption of the contents of an email message using S/MIME or other standards and protocols by which the contents of an email message can be encrypted, where the encryption and decryption are performed by the sender mail server and recipient mail server, respectively. In this way, in the event that a relay mail server is employed to relay an email message or a mail transport message containing the email message, the relay mail server is unable to access the contents of the email message without decrypting the encrypted content. Embodiments of the disclosure can operate by configuring a sender mail server through which email is sent by a sender to obtain a public encryption key corresponding to a recipient mail server. An encrypted payload can be generated by the sender mail server using the public key and incorporated into a mail transport message that is sent to a recipient mail server. The recipient mail server can then decrypt the encrypted payload using a private encryption key corresponding to the public encryption key and deposit the email message into a mailbox or mail folder corresponding to the recipient of the email message.

With reference to FIG. 1, shown is a networked environment 100 according to various embodiments. The networked environment 100 includes at least one computing environment 103, a client device 106, a relay mail server 107 and a key server 109 which are in data communication with each other via a network 113. The network 113 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks.

The computing environment 103 may comprise, for example, a server computer or any other system providing computing capability. Alternatively, the computing environment 103 may employ a plurality of computing devices that may be arranged, for example, in one or more server banks, computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time. The computing environment 103 may also include or correspond to one or more virtualized server instances that are created in order to execute the functionality that is described herein.

Various applications and/or other functionality may be executed in the computing environment 103 according to various embodiments. Also, various data is stored in a data store 116 that is accessible to the computing environment 103. The data store 116 may be representative of a plurality of data stores 116 as can be appreciated. The data stored in the data store 116, for example, is associated with the operation of the various applications and/or functional entities described below.

The components executed on the computing environment 103, for example, include a mail server 119 and other applications, services, processes, systems, engines, or functionality not discussed in detail herein. A computing environment 103 can represent a sender mail server, or a mail server 119 through which an email is sent as well as a relay mail server or recipient mail server 119. A recipient mail server 119 can represent a mail server 119 to which an email is sent according to embodiments of the disclosure. The mail server 119 is executed to provide mail server functionality and may comprise multiple mail servers executed by a computing environment 103 to provide access to enterprise data on behalf of a large user base. The mail server 119 can facilitate remote access to email, calendar information, contacts or other resources on behalf of a user. The mail server 119 can facilitate download and/or synchronization of email, calendar information, contacts and/or tasks that are stored in a user's mailbox. The mail server 119 can also facilitate transport of email messages or other types of communications between one or more mail server 119.

For example, the mail server 119 can implement a mail transport protocol, such as SMTP or any other protocol that facilitates transport of email messages via the network 113.

In other words, the mail server 119 can also send and receive email messages, calendar appointment requests and other messages on behalf of a user to other mail servers that are accessible to the mail server 119 via a network connection. In some embodiments, the mail server 119 can also implement a mail synchronization standard or specification, such as MICROSOFT ACTIVESYNC, that facilitates synchronization of a user's data with a client device 106 assigned to the user.

The data stored in the data store 116 includes, for example, user data 117, encryption data 118, and potentially other data. The user data 117 can include data associated with a user account, such as profile data 132, mailbox data 133 and potentially other data. Profile data 132 can also include access settings, such as authentication credentials, delegation settings (e.g., information about other users who may be provided access to the profile data 132 of a particular user), mail and document retention rules and/or policies, and/or other geographic access restrictions or limitations (e.g., information about certain locations and/or networks from which profile data 132 can be accessed). Profile data 132 can also include other account settings, such as biographical or demographic information about a user, password reset information, multi-factor authentication settings, and other data related to a user account as can be appreciated.

Mailbox data 133 includes data associated with one or more mailboxes corresponding to a user account of a user. The mailbox data 133 can include electronic mail messages, mail folders into which messages are organized, filtering rules that are applied to incoming and/or outgoing mail messages, attachments associated with mail messages, and/or other data associated with a mailbox of a user. Mailbox data 133 can also include, for example, calendar information such as appointments, reminders, tasks and/or other data that can be associated with a timestamp or date stamp. Such calendar data can include appointments that are associated with a particular location and/or user. For example, an appointment can be linked with a particular location, meeting room, building, address or other location. An appointment can also be linked with another user who is internal or external to an organization or domain of the user as well as with text and/or attachments. Mailbox data 133 can also include tasks, reminders, or other types of data that can be associated with a time and/or place and placed on a calendar.

Mailbox data 133 can also include contact data, such as personal information manager (PIM) or address book data related to contacts of a particular user. Such contact data can include external email addresses, telephone contact information, mailing addresses, contact notes, and other information associated with contacts that a user may wish to maintain in an address book or contacts store. Contact data can also include user specific address book data as well as global address book data for address books that are shared among multiple users in a domain and/or enterprise. It should be appreciated that a client device 106 of a user may also be synchronized with various other forms of data other than mailbox data 133 and that the depicted example is shown merely for illustrative purposes.

For example, a client device 106 of a user may also be synchronized or provided access to documents, media or other types of files that are stored in a data store 116 via the mail server 119 or other type of synchronization application in accordance with various embodiments of the present disclosure. The client device 106 can be configured to access such resources that are stored in or on the client device 106, in a data store 116 or any other location via any type of application that is executed by the client device 106, and the depicted example of a mail client 129 being configured to access mailbox data 133 is but one example.

Encryption data 118 can comprise information about encryption keys that can be employed in a public key/private key encryption protocol or methodology. For example, the encryption data 118 can store encryption keys that can be used by the mail server 119 to encrypt the contents of email messages that are transmitted to another mail server 119 on behalf of a sender of the email message. Accordingly, the public key 139 can represent a public encryption key that is specific to a particular computing environment 103, mail server 119 and/or organization associated with either the computing environment 103 or the mail server 119. The public key 139 can be distributed to other mail servers 119 and used to encrypt the contents or payload of mail transport messages that are sent by other mail servers 119 to the mail server 119.

The private key 141 can represent a private encryption key that is specific to a particular computing environment 103, mail server 119 and/or organization associated with either the computing environment 103 or the mail server 119. The private key 141 can be employed to decrypt the contents or payload of mail transport messages that are sent by other mail servers 119 to a particular mail server 119. In some embodiments, the public key 139 and private key 141 are specific to an organization and not to particular users within the organization. In this way, mail transport messages sent by a particular mail server 119 corresponding to an organization is encrypted using the public key 139 of the organization, or an organizational key, and not a public key that is specific or exclusive to a particular user sending an email message. Such a framework facilitates encryption of mail transport messages but does not place the burden of encrypting email messages on the user.

In some embodiments of the disclosure, the encryption data 118 can include public keys 139 and private keys 141 that are specific to particular users of the mail server 119. In one embodiment, the encryption data 118 can include keys for each user of the mail server 119 so that the mail server 119 can facilitate distribution of a user's public key 139 to other mail servers 119 or other users who may wish to encrypt a message sent to a particular user with the user's public key 139. Additionally, the mail server 119 can also decrypt incoming email that is encrypted using the user's public key 139 of behalf of the user using a private key 141 that is specific to the user.

The client device 106 is representative of a plurality of client devices that may be coupled to the network 113. The client device 106 may comprise, for example, a processor-based system such as a computer system. Such a computer system may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 may include a display that comprises, for example, one or more devices such as liquid crystal display (LCD) displays, gas plasma-based flat panel displays, organic light emitting diode (OLED) displays, LCD projectors or other types of display devices.

The client device 106 may be configured to execute various applications, such as a mail client 129, a browser 131 or other applications. The mail client 129 may be executed to facilitate access to user data 117 of a user, such as mailbox data 133. To this end, the mail client 129 is configured with a network address of the mail server 119 with which to communicate in order to retrieve and/or synchronize mailbox data 133. The mail client 129 is also configured with a username, password, an authentication certificate, or other authentication credentials with which the mail client 129 can be authenticated in order to access user data 117 associated with the user. Additionally, the mail client 129 is also configured to facilitate the sending or email messages via the mail server 119 on behalf of a user of the client device 106. For example, the mail client 129 can include an editor in which a user can compose an email message. The mail client 129 can also initiate a request to send the email message using the mail server 119 to a recipient identified by an email address that includes a username as well as a domain name (e.g., username@example.com). Upon receiving a request to send the email message to a recipient, the mail server 119 can identify a recipient mail server 119 based upon the various parts of the email address, such as the domain name following the username.

The client device 106 can, in some embodiments, also execute a browser 131. The browser 131 can render a web-based user interface that facilitates browsing of a mailbox of a user as well as the composing and/or sending of email messages through the mail server 119. For example, a sender of an email can, via the web-based user interface, initiate a request to send an email message through the mail server 119 to a recipient identified by an email address. Upon receiving a request to send the email message to a recipient, the mail server 119 can identify a recipient mail server 119 based upon the various parts of the email address, such as the domain name following the username.

In the networked environment 100 of FIG. 1, a relay mail server 107 can represent a computing device or computing environment through which an email message sent through the mail server 119 can be relayed. If internet routing issues, connectivity issues or other issues dictate that a particular email message should be relayed through a relay mail server 107, a particular email message may be sent to a mail server 121 executed by the relay mail server 107, which can forward, or relay, the email message to a destination mail server 119. Accordingly, the relay mail server 107 can implement SMTP or any other mail transport protocol, but the relay mail server 107 need not support the encryption and/or decryption capabilities of a mail server 119 according to embodiments of the disclosure, as it merely acts as a mail relay. It should be appreciated that a relay mail server 107 is not required in order for a mail server 119 according to embodiments of the disclosure to operate as described herein and that the relay mail server 107 is shown only for illustrative purposes.

A key server 109 can represent one or more computing devices, computing environments or other servers from which a public key 139 associated with a particular instance of a mail server 119 or a particular organization can be obtained. In one embodiment, the key server 109 can represent a service that is a key authority or a certificate authority from which a sender mail server 119 can request a particular public key 139 associated with a recipient mail server 119 to which the sender mail server 119 is sending an email message embedded within a mail transport message. In some embodiments, the key server 109 can be maintained by an entity, a computing environment and/or computing device that is external to a recipient mail server 119 and/or a sender mail server 119.

Accordingly, various data is stored in a key repository 153 that is accessible to the key server 109. The key repository 153 may be representative of a plurality of data stores or other storage devices or services as can be appreciated. The data stored in the key repository 153, for example, can include key data 155. Key data 155 can include organizational data 157 with which a particular organization, mail server 119 and/or computing environment 103 can be identified. For example, a particular organization may be identified according to a domain name, internet protocol (IP) address or other name. In this way, a sender mail server 119 can submit a request to the key server 109 with information with which a particular organization can be identified so that the key server 109 can reply to the request with an appropriate public key 139 that corresponds to the organization. Key data 155 can also include a public key 158 that corresponds to a particular organization, which represents a copy of a public key 139 associated with an organization, computing environment 103 and/or a mail server 119.

Next, a general description of the operation of the various components of the networked environment 100 is provided. To begin, a sender of an email message can initiate a request to send the email message to one or more recipients specified by one or more email addresses. Such a request can be generated via a mail client 129 and/or a user interface rendered by a browser 131 (e.g., via a sender sending the email message). In response to receiving such a request, the mail server 119 can identify the one or more recipients of the email message as well as identify or obtain, based upon the identity of the recipient, a public key 158 from the key server 109 that corresponds to the recipient's organization.

In one embodiment, upon identifying a domain name associated with a recipient email address, the mail server 119 can submit a request to the key server 109 that includes the domain name of the recipient email address. The key server 109 can identify a particular public key 158 corresponding to the domain name and issue a response to such a request that includes a copy of the public key 158 of the recipient mail server 119. The mail server 119 can then generate an encrypted payload by encrypting the email message and incorporate this encrypted payload into a mail transport message. Such a mail transport message can be generated according to the S/MIME standard and transmitted to a relay mail server 107 for relaying to a recipient mail server 119 or directly transmitted to the recipient mail server 119.

As noted above, the public key 158 with which the encrypted payload is generated can be specific or exclusive to an organization of the recipient mail server 119 but not specific or exclusive to a particular user to whom the email message corresponding to the encrypted payload is sent. In other words, should an email message be sent to another user in the same organization, the email message can also be encrypted using the same public key 158. In this way, mail transport messages that are generated are encrypted without the need for individual users to obtain key pairs or manage any encryption keys. In some embodiments, such a public key 158 can be exclusive to a set of users within an organization rather than an entire organization. Accordingly, the content of an email message from which a mail transport message is generated and that might be relayed through a relay mail server 107 cannot be easily accessed by the relay mail server 107 because the relay mail server 107 does not have access to the private key 141 corresponding to the public key 158 from which the encrypted payload was generated.

Upon receiving a mail transport message containing an encrypted payload that is encrypted with a public key 158 by the sender mail server 119, a recipient mail server 119 according to embodiments of the disclosure can decrypt the encrypted payload of the mail transport message using the private key 141 of an organization that corresponds to the recipient mail server 119. Again, as noted above, in one embodiment, the private key 141 can be exclusive to entire organization, a plurality of users and/or a domain rather than being exclusive to an individual user. Upon decrypting the encrypted payload of the mail transport message, the recipient mail server 119 can identify a user or recipient corresponding to the email message, extract the email message from the mail transport message and deposit the email message into a mailbox, a mail folder, or other location associated with a user account of the recipient within the organization. Then, a recipient user may access the email message via a mail client 129 and/or a web-based mail user interface rendered by a browser 131.

Figure 2:
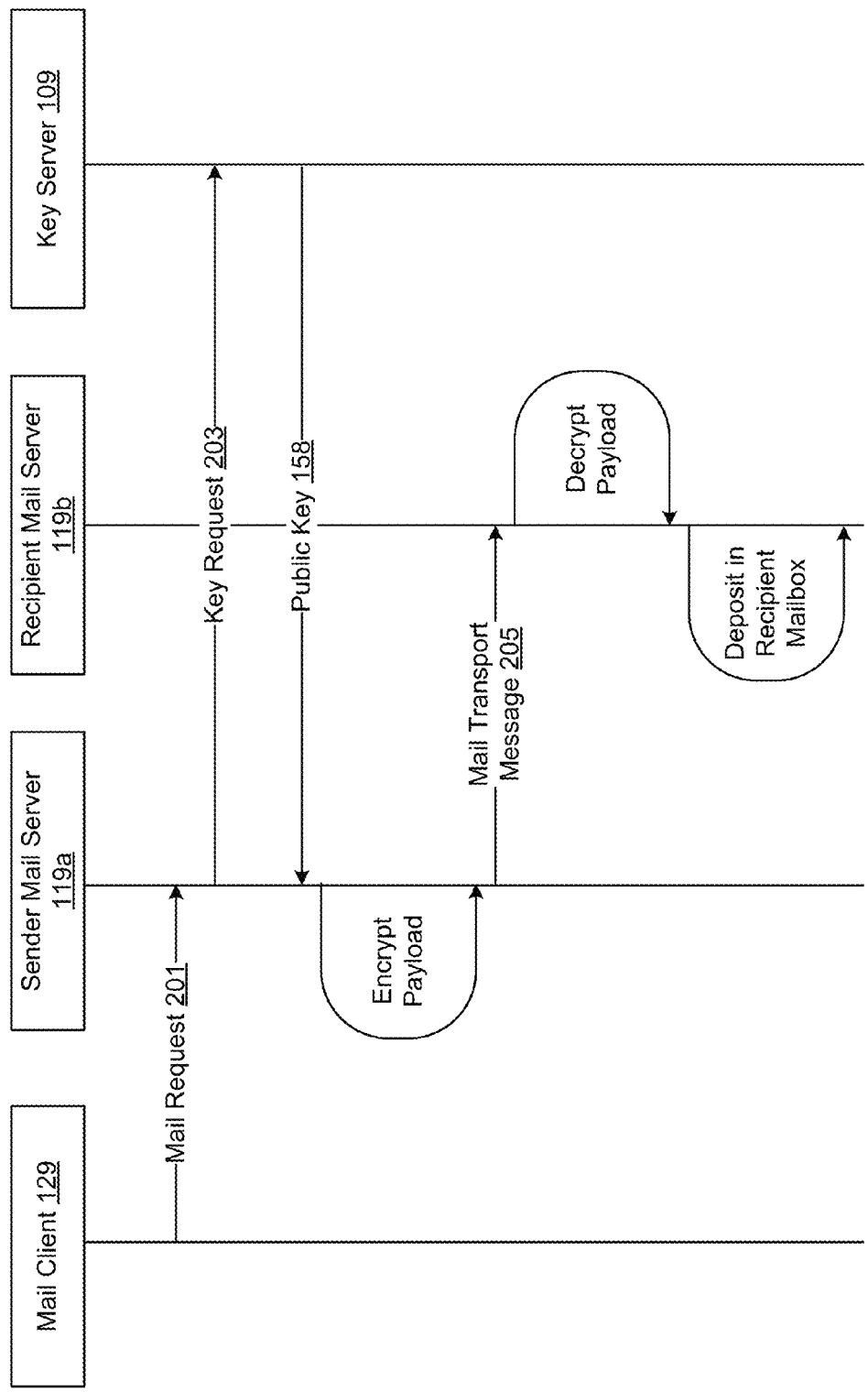
FIG. 2 is a sequence diagram illustrating operation of various components in the networked environment of FIG. 1 according to various embodiments of the present disclosure.

Referring next to FIG. 2, shown is an example sequence diagram that illustrates one example of interactions between the various components illustrated in the example networked environment 100 of FIG. 1. FIG. 2 illustrates an example in which an email message is sent to a recipient by a sender from a client device 106 executing mail client 129. As shown in FIG. 2, the mail client 129 executed by the client device 106 generates a request to send an email message to a recipient, which is referred to in FIG. 2 as a mail request 201. The mail request 201 is transmitted from the mail client 129 to a sender mail server 119*a*, or a mail server 119 corresponding to an organization associated with the sender of the email message. The sender mail server 119*a* can then issue a key request 203 to the key server 109, which is a request to obtain a public key 158 corresponding to an organization of a recipient of the email message. In response to the key request 203, the key server 109 can identify a public key 158 corresponding to the organization of the recipient of the email message based upon the domain name of the email address, the domain name of a recipient mail server 119*b* associated with the email address, an IP address associated with the recipient mail server 119*b*, or any other identifying information.

In response to the key request 203, the key server can transmit a public key 158 corresponding to an organization of the recipient of the email message. In some embodiments, the sender mail server 119*a* may store a cached version of a public key 158 corresponding to the recipient mail server 119*b* and forego issuing a key request 203 to the key server 109 if a cached copy of the public key 158 is maintained by the sender mail server 119*a*. The sender mail server 119*a* can generate an encrypted payload corresponding to the email message, where the encrypted payload is encrypted using the public key 158 corresponding to the recipient mail server 119*b* and/or an organization corresponding to the recipient. The sender mail server 119*a* can then transmit a mail transport message 205 having an encrypted payload corresponding to the email message sent by the sender to the recipient mail server 119*b*. As noted above, the mail transport message 205 with an encrypted payload can be assembled and/or formatted according to the S/MIME standard or any other standard in which mail encryption is supported.

The recipient mail server 119*b* can then decrypt the encrypted payload of the mail transport message 205 corresponding to the email message sent by the sender. The recipient mail server 119*b* can extract the email message from the encrypted payload and deposit the email message into a mailbox of the recipient.

Figure 3:
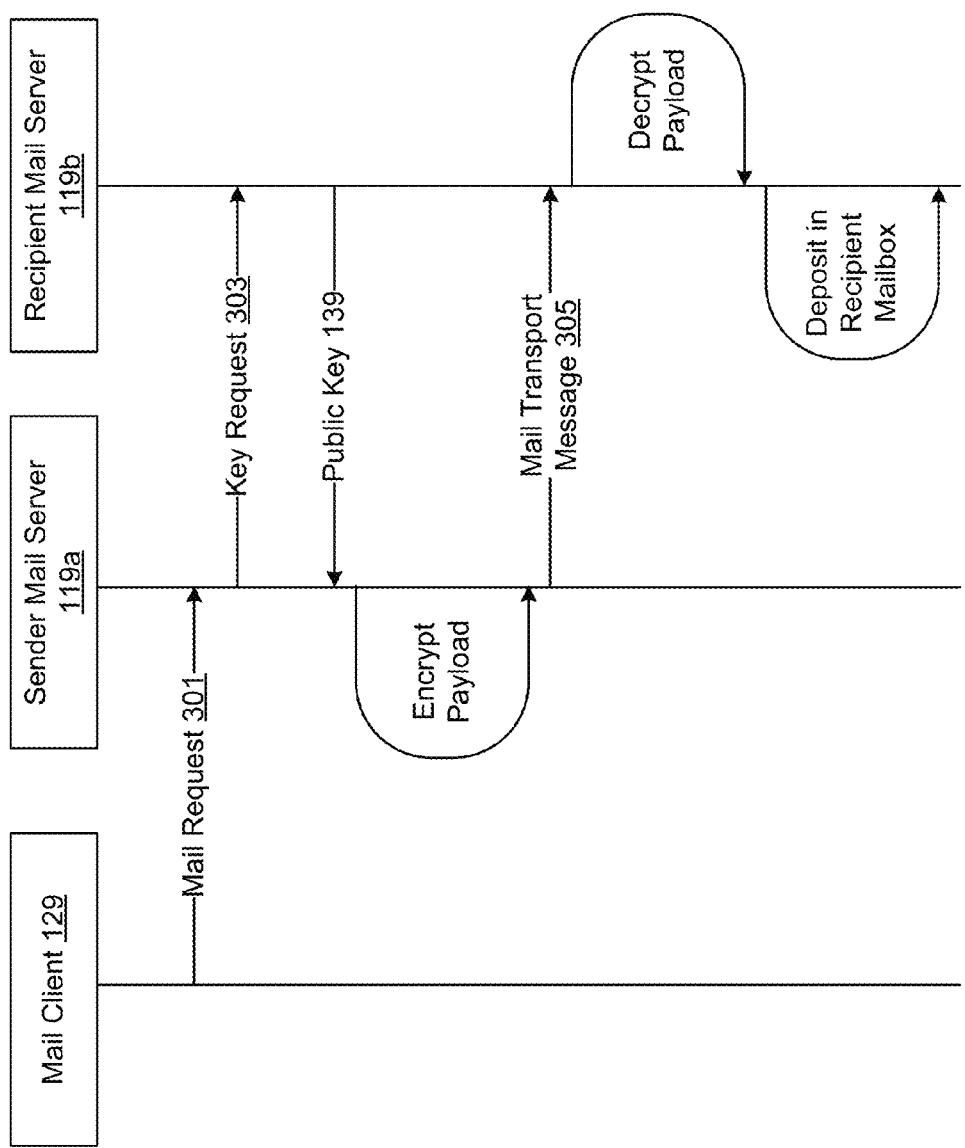
FIG. 3 is a sequence diagram illustrating operation of various components in the networked environment of FIG. 1 according to various embodiments of the present disclosure.

Referring next to FIG. 3, shown is an example sequence diagram that illustrates one example of interactions between the various components illustrated in the example networked environment 100 of FIG. 1. FIG. 3 illustrates an alternative example in which an email message is sent to a recipient by a sender from a client device 106 executing mail client 129. In the example of FIG. 3, an embodiment is shown in which the sender mail server 119a can obtain the public key 139 corresponding to the recipient mail server 119b directly from the recipient mail server 119b rather than from a key server 109 as in the example of FIG. 2.

As shown in FIG. 3, the mail client 129 executed by the client device 106 generates a request to send an email message to a recipient, which is referred to in FIG. 2 as a mail request 301. The mail request 301 is transmitted from the mail client 129 to a sender mail server 119a, or a mail server 119 corresponding to an organization associated with the sender of the email message. The sender mail server 119a can then issue a key request 303 to the recipient mail server 119b, which is a request to obtain a public key 139 corresponding to the recipient of the email message. In response to the key request 303, the recipient mail server 119b can transmit a copy of the public key 139 corresponding to an organization associated with the recipient mail server 119b to the sender mail server 119a.

In some embodiments, the sender mail server 119a may store a cached version of a public key 139 corresponding to the recipient mail server 119b and forego issuing a key request 303 to the recipient mail server 119b if a cached copy of the public key 139 is maintained by the sender mail server 119a. The sender mail server 119a can generate an encrypted payload corresponding to the email message, where the encrypted payload is encrypted using the public key 139 corresponding to the recipient mail server 119b and/or an organization corresponding to the recipient. The sender mail server 119a can then transmit a mail transport message 305 having an encrypted payload corresponding to the email message sent by the sender to the recipient mail server 119b. As noted above, the mail transport message 305 with an encrypted payload can be assembled and/or formatted according to the S/MIME standard or any other standard in which mail encryption is supported.

The recipient mail server 119b can then decrypt the encrypted payload of the mail transport message 305 corresponding to the email message sent by the sender. The recipient mail server 119b can extract the email message from the encrypted payload and deposit the email message into a mailbox of the recipient.

Figure 4:
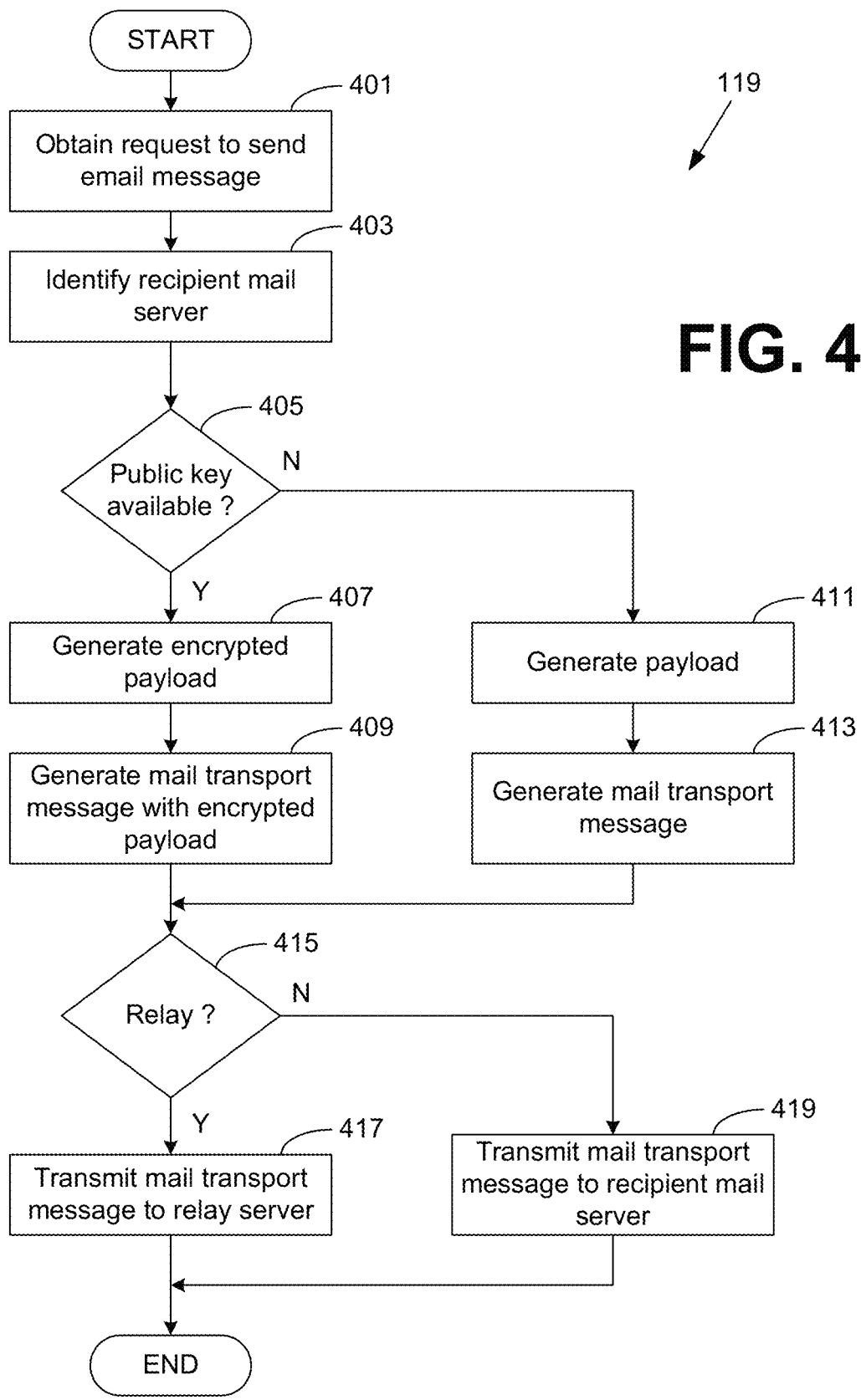
FIG. 4 is a flowchart illustrating one example of functionality implemented as portions of a mail server executed in a computing environment in the networked environment of FIG. 1 according to various embodiments of the present disclosure.

Referring next to FIG. 4, shown is a flowchart that provides one example of the operation of a portion of the mail server 119 according to various embodiments. It is understood that the flowchart of FIG. 4 provides merely an example of the many different types of functional arrangements that may be employed to implement the operation of the portion of the mail server 119 as described herein. As an alternative, the flowchart of FIG. 4 may be viewed as depicting an example of elements of a method implemented in the computing environment 103 (FIG. 1) according to one or more embodiments.

Beginning with box 401, the mail server 119 obtains a request to send an email message from a mail client 129. As noted above, such a request can also be generated via a user interface rendered by a browser 131 in some embodiments. Such a request can be initiated when a sender attempts to send an email message to a recipient. At box 403, the mail server 119 can identify a recipient mail server 119 associated with a recipient of the email message. The recipient mail server 119 can be identified based upon a domain name associated with the recipient email address. The mail server 119 can identify the recipient mail server 119 by querying a mail exchanger record (MX record) associated with the domain name of the recipient email address.

At box 405, the mail server 119 can determine whether a public key 158 associated with the recipient mail server 119 is available via the key server 109 and/or from the recipient mail server 119. If so, then the mail server 119 can obtain the public key 158 and generate an encrypted payload comprising the email message at box 407. At box 409, the mail server 119 can generate a mail transport message that includes the encrypted payload. If no public key 158 associated with the recipient mail server 119 is available, then at box 411, the mail server 119 can generate an unencrypted payload and a corresponding mail transport message at box 413.

At box 415, the mail server 119 can determine whether the mail transport message should be transmitted to a relay mail server 107 or to the recipient mail server 119 directly. If the mail transport message should be relayed through a relay mail server 107, then at box 417, the mail server 119 transmits the mail transport message to a relay mail server 107 for relaying to the recipient mail server 119. Otherwise, the mail server 119 can transmit the mail transport message to the recipient mail server 119 directly at box 419. Thereafter, the process shown in FIG. 4 proceeds to completion.

Figure 5:
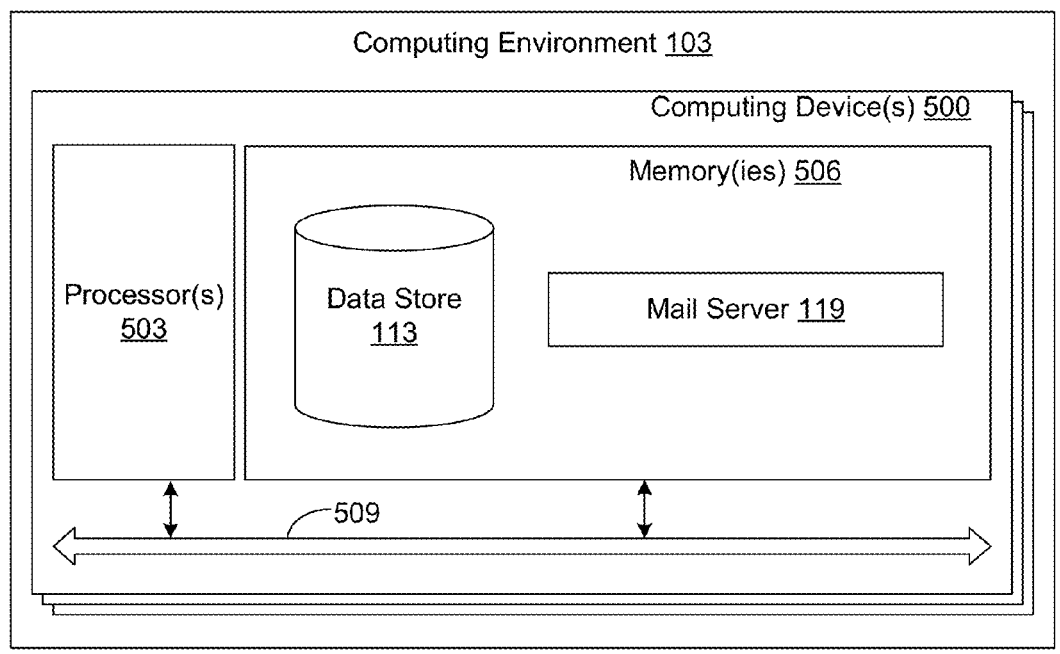
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 and/or client device 106 includes at least one processor circuit, for example, having a processor 503 and a memory 506, both of which are coupled to a local interface 509. As such, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the mail server 119 and potentially other applications. It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript, Perl, PHP, Visual Basic, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components. The memory 506 is defined herein as including both volatile and nonvolatile memory and data storage components.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the mail server 119 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows an example of the functionality and operation of an implementation of portions of the mail server 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the mail server 119, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the mail server 119, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500 or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program, when executed by the at least one computing device, being configured to cause the at least one computing device to at least:

receive a request to transmit an email message corresponding to a sender associated with a sender mail server to a recipient associated with a recipient mail server;

determine an identity of the recipient mail server based at least in part upon a domain or an internet protocol (IP) address of the recipient mail server;
obtain a public encryption key associated with the recipient mail server based at least in part upon the identity of the recipient mail server;
generate an encrypted payload based at least in part upon the email message using the public encryption key, wherein:
the public encryption key comprises an organizational key associated with a plurality of users having user accounts associated with the recipient mail server, and
the organizational key is not exclusive to the recipient of the email message.

2. The non-transitory computer-readable medium of claim 1, wherein the mail transport message is generated according to a secure/multipurpose internet email extensions (S/MIME) standard.

3. The non-transitory computer-readable medium of claim 1, wherein the program is further configured to cause the at least one computing device to at least:
generate a mail transport message, the mail transport message comprising the encrypted payload; and
transmit the mail transport message to at least one of the recipient mail server or a relay mail server.

4. The non-transitory computer-readable medium of claim 3, wherein the mail transport message is relayed by the sender mail server to the recipient mail server.

5. The non-transitory computer-readable medium of claim 1, wherein the public encryption key corresponds to a private encryption key associated with the recipient mail server.

6. The non-transitory computer-readable medium of claim 5, wherein the private encryption key is accessible to the recipient mail server and inaccessible to a relay mail server.

7. The non-transitory computer-readable medium of claim 1, wherein the public encryption key is obtained from a key server accessible to the sender mail server via a network.

8. A system, comprising:
at least one computing device;
programming code executable in the at least one computing device, the programming code comprising:
logic that receives a mail transport message comprising an encrypted payload from a sender mail server, the encrypted payload being encrypted using a public encryption key associated with the at least one computing device;
logic that decrypts the encrypted payload using a private encryption key corresponding to the at least one computing device to extract an email message from the encrypted payload;
logic that identifies a user corresponding to a recipient specified by the email message;
logic that identifies a user mailbox corresponding to the user; and
logic that deposits the email message into the user mailbox, wherein:
the public encryption key comprises an organizational key associated with a plurality of users having user accounts associated with the at least one computing device, and
the organizational key is not exclusive to the recipient of the email message.

9. The system of claim 8, wherein the mail transport message is generated according to a secure/multipurpose internet email extensions (S/MIME) standard.

10. The system of claim 8, wherein the mail transport message is relayed to the at least one computing device by another mail server.

11. The system of claim 8, wherein the private encryption key comprises an organizational key associated with an organization corresponding to the at least one computing device.

12. The system of claim 8, wherein the private encryption key is not exclusive to the user or the user mailbox.

13. The system of claim 8, wherein the public encryption key corresponding to the private encryption key is stored on at least one key server external to the at least one computing device.

14. The system of claim 8, wherein the private encryption key is exclusive to at least one of the user or the user mailbox.

15. The system of claim 8, wherein the programming code further comprises:
logic that receives, from a sender mail server, a request for the public encryption key; and
logic that transmits the public encryption key to the sender mail server in response to receiving the request.

16. A computer-implemented method, comprising:
obtaining, using one or more processors within a sender mail server, a request to send an email message to a recipient, the recipient being associated with a user account in a recipient mail server;
obtaining, using the one or more processors within the sender mail server, a public encryption key associated with the recipient mail server;
generating, using the one or more processors within the sender mail server, an encrypted payload using the public encryption key, the encrypted payload including the email message;
generating, using the one or more processors within the sender mail server, a mail transport message comprising the encrypted payload; and
transmitting, from the sender mail server, the mail transport message to the recipient mail server, wherein:
the public encryption key comprises an organizational key associated with a plurality of users having user accounts associated with the recipient mail server, and
the organizational key is not exclusive to the recipient of the email message.

17. The method of claim 16, wherein obtaining the public encryption key associated with the recipient mail server further comprises;
transmitting, from the sender mail server, a request to retrieve the public encryption key to a key server external to the sender mail server and the recipient mail server; and
obtaining, in the sender mail server, a response to the request from the key server, the response comprising the public encryption key.

18. The method of claim 16, wherein obtaining the public encryption key associated with the recipient mail server further comprises;
transmitting, from the sender mail server, a request to retrieve the public encryption key to the recipient mail server; and
obtaining, in the sender mail server, a response to the request from the recipient mail server, the response comprising the public encryption key.

19. The method of claim 17, further comprising identifying, within the sender mail server, the organization based at least in part upon a domain associated with the recipient.

* * * * *